Aug. 22, 1967

C. W. RAETZSCH ETAL 3,337,443

ELECTROLYTIC CELL

Filed March 4, 1964

INVENTORS
CARL W. RAETZSCH
JOHN F. VAN HOOZER
HUGH CUNNINGHAM

BY Oscar L. Spencer

ATTORNEY

Aug. 22, 1967    C. W. RAETZSCH ETAL    3,337,443
ELECTROLYTIC CELL

Filed March 4, 1964    7 Sheets-Sheet 3

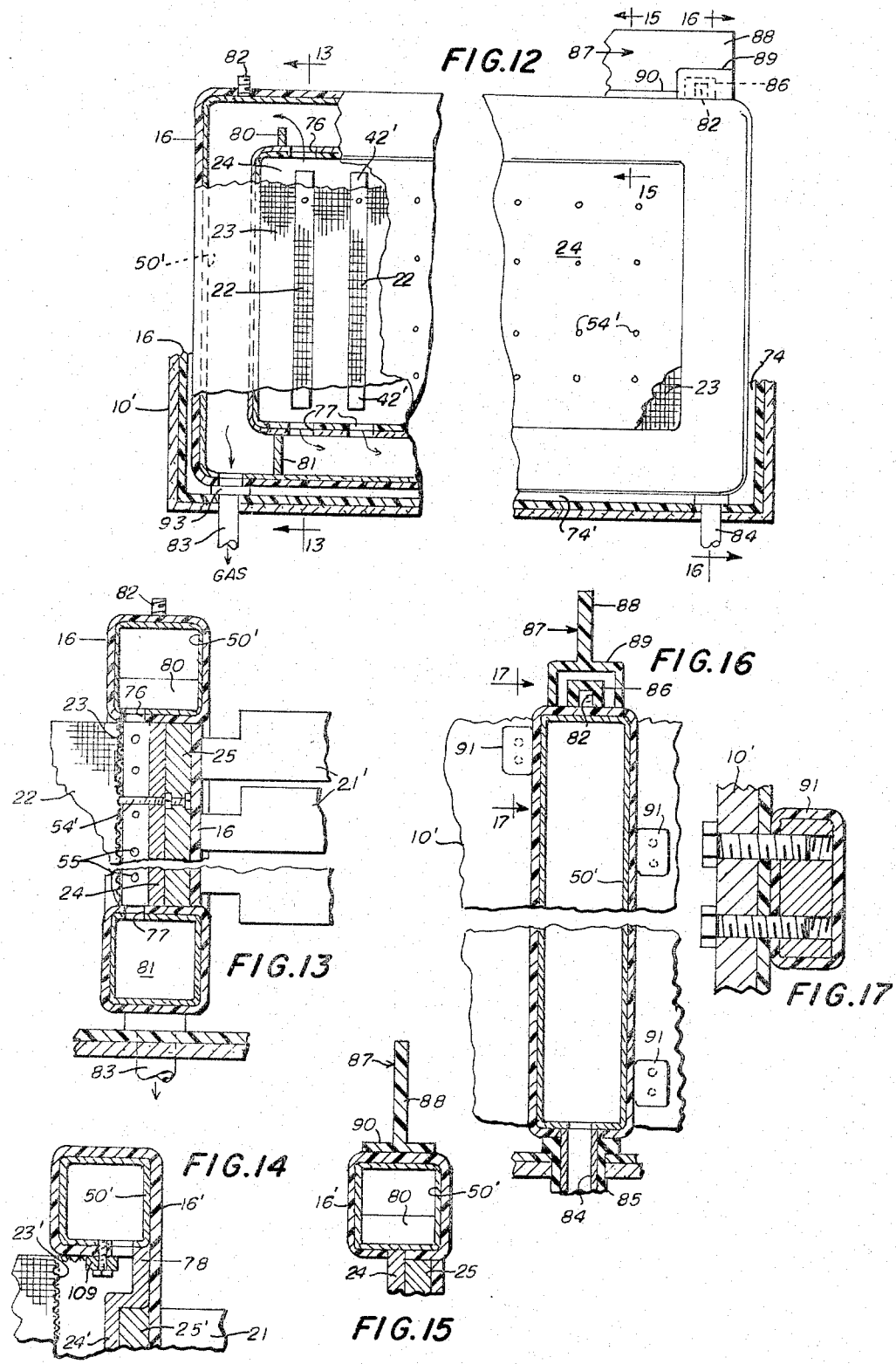

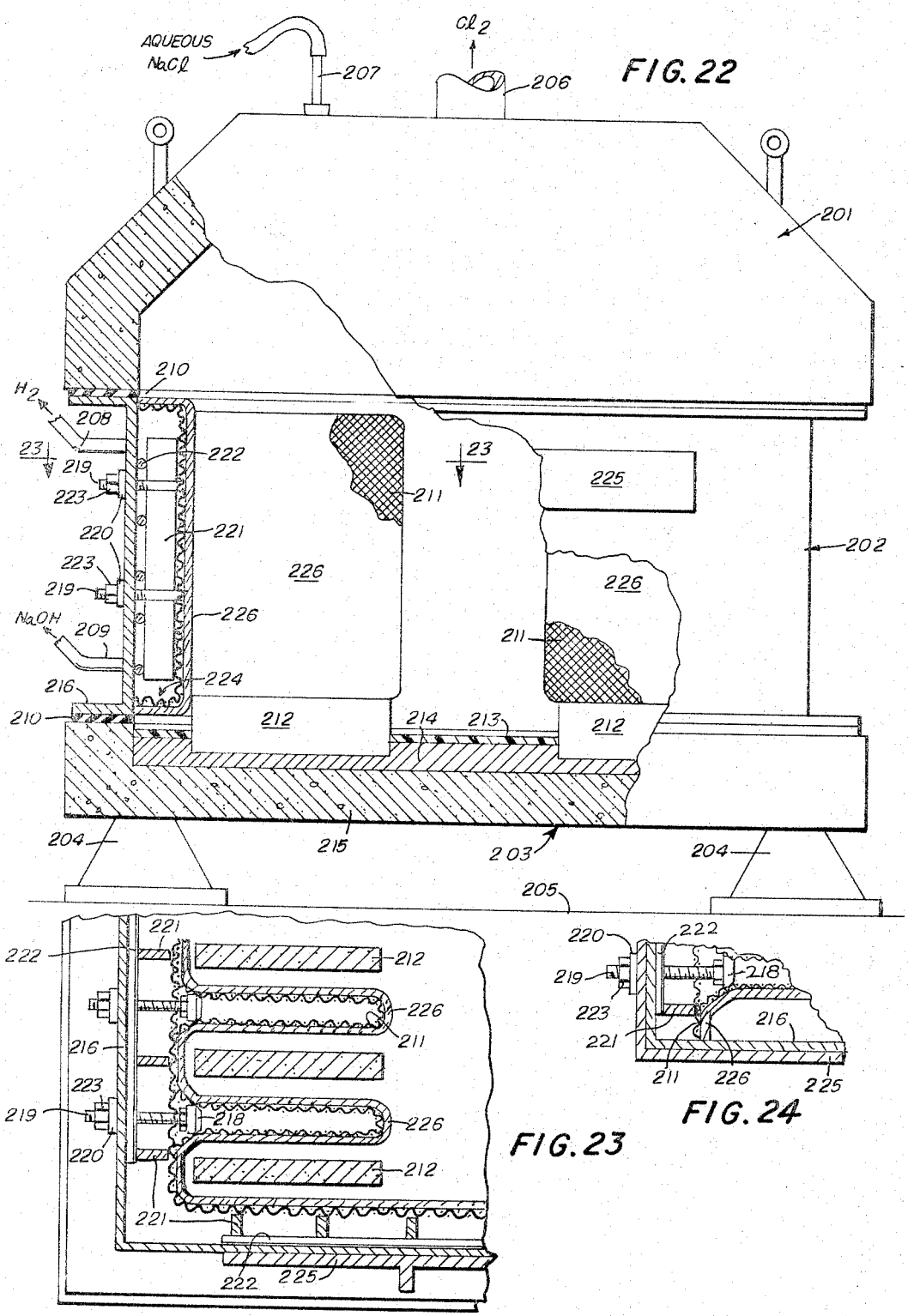

3,337,443
ELECTROLYTIC CELL
Carl W. Raetzsch, Hugh Cunningham, and John F. Van Hoozer, Corpus Christi, Tex., assignors to Pittsburgh Plate Glass Company, Pittsburgh, Pa., a corporation of Pennsylvania
Filed Mar. 4, 1964, Ser. No. 349,273
34 Claims. (Cl. 204—256)

This invention is concerned with an improved electrolytic alkali-chlorine cell, in which certain disadvantages inherent in known electrolytic cells have been overcome. More specifically, the improved cell of the present invention is concerned with electrolytic alkali-chlorine diaphragm cells having bipolar electrodes.

A variety of types of electrolytic cells employing a bipolar electrode assembly and a permeable diaphragm have been designed by workers in the past. The present trend in this type of cell is to provide, within a single cell housing, a plurality of individual cell units utilizing bipolar electrode structures. In such an electrode structure, the anodes of one cell are positioned in a back-to-back relationship with the cathodes of the adjacent cell, and electrical contact is maintained between the two. The supporting means for the anodes and cathodes in the back-to-back relationship functions also to physically separate the cells within the overall cell housing. In this application, the term "cell unit" is used to describe the back-to-back bipolar assembly of the anodes of one cell with the cathodes of the adjacent cell. The term "single cell" is used to describe the cell formed by interleaved anode blades and cathode fingers, the supports therefor, and the housing walls. The cathodes of each cell unit have elongated hollow portions hereinafter called "cathode fingers" which are interleaved or interpositioned with and spaced from the anodes of the next adjacent cell unit, the anodes also being elongated, of course. The elongated anode elements are hereinafter referred to as "anode blades." The shape and juxtaposition of the electrodes permits the electrolyte to be exposed to the maximum surface area of the electrodes with minimal unit cell volume. The cathodes are constructed of metal wire screening or the like and covered with a permeable diaphragm, of asbestos, for example, to prevent mixing of the anolyte and catholyte and to allow for collection of the reaction product. In general, the interiors of the cathode fingers do not terminate in the electrode supporting means, but rather terminate in a cathode compartment. This cathode compartment is formed by wire screening spaced a slight distance from the electrode support and is parallel thereto. Catholyte is contained in the interiors of the cathode fingers and in the cathode compartment.

The electrode assemblies of the prior art have principally been of two types, those having an immovable support means to which the electrodes are affixed and those having a movable support means to which the electrodes are affixed.

In those cells having an immovable supporting means for the electrodes, the cell housing may be of concrete which is cast around and made integral with the support means, such as a graphite plate, or the housing may be of steel. In either case, a corrosion resistant lining is used. The graphite anodes are pressed into and cemented to the graphite support means, while the cathode, carrying the cathode fingers, is secured to the other side of the graphite support means. Thus, in this type of assembly, the electrical energy distribution is from the graphite anode, through the graphite support, through the cathode securing means and finally to the cathode fingers.

The cells of the type having a movable supporting means utilizes as a support a metallic electrode support plate, such as steel, to which the electrodes are attached. By means of suitable slots constructed in the cell housing, the plate is supported within the housing. The electrode assembly in this type of cell is similar to the above-described cell, with the exception that an additional component is added, the plate. Thus, the energy distribution through this type of cell is from the graphite anodes, through the graphite support material to the backer plate. From the plate the energy is distributed thence to the cathode screen and cathode fingers. In some cases metallic clips, such as of copper, have been positioned between the anodes, cathodes, and electrode support to improve conductivity.

Repair and maintenance of graphite anode blades in such cells have presented serious problems in the past, as has been suggested above. One common method of mounting such blades requires a vertical graphite or copper support, wherein the support is attached to the cell divider. The support is supplied with a channel or slot, which is tapered so that it is narrower at the bottom of the slot than at the surface of the support. The end of the blade is tapered to provide a tight fit, and the blade is then pressed into place. Commonly, each blade is made of several segments stacked one on the other. In replacing worn or broken blades, or the support, the embedded portion commonly breaks, making it difficult or impossible to salvage the support and/or blade. Even where there is no breakage, the slot and blade abrade one another, and after several changes, one or more parts must be replaced.

Another difficulty has been encountered in attempting to provide uniform and efficient current flow between the anodes of one cell and the cathodes of the adjacent cell, as well as in attempts to provide even current distribution and flow between the cathode fingers and the electrolyte at different points on the fingers. Where such flow is heavy in some areas and weak in others, inefficient operation of the cell results.

The conventional cathode finger is simply woven wire, and commonly the intersection of one wire with one which crosses it provides a substantial resistance to current flow. Whether caused by an oxide coating or a poor electrical contact, it nevertheless presents a problem.

The present invention overcomes these and other disadvantages of prior art devices.

The cell of the present invention has improved electrode assemblies which provide a very low electrical resistance and improved current distribution between the bipolar electrodes, thus providing a high power-efficiency. Additionally, the novel electrode assemblies of the present invention are simplified in their construction and operation.

The cell of the instant invention also has an improved means for the collection of the gaseous cathodic reaction product. Such means, in addition to greatly simplifying the construction and maintenance of the cell, provides greater flexibility and independence in the operation and design of a cell installation employing the novel cell unit herein disclosed. Other advantages of the improved electrode assembly and cathodic gas collection means of this novel electrolytic cell will be apparent from the following.

Still another feature of the invention is the provision of hollow tubular supports for the planar electrode support plate, said hollow supports serving to conduct gas and liquid from the interior of the cathode compartment. In one embodiment the support means are simply vertical posts, and in a preferred embodiment the electrode support plate is fastened to an endless hollow tubular frame, said frame being generally rectangular in outline. Preferably the gaseous and liquid products from the cathode compartment are conducted from the interior of the hollow frame through the bottom of the cell.

Another problems in prior art cells is concerned with the necessity of maintaining a hydrostatic head of liquid anolyte in the apparatus, such head being essential to proper and efficient operation of the diaphragm cathodes. Commonly, the cathodes are within a main housing or body, and the hydrostatic head is maintained by having a wall or cover which extends upwardly a substantial distance thus providing adequate space to obtain the proper hydrostatic head. The cover also provides for the flow of gas from the upper part of the cell housing. Related to this problem, and useful with either a plural cell assembly or a single cell apparatus, a further improvement of this invention makes it unnecessary to have bulky, high covers or tangs requiring large amounts of material for their manufacture.

Still another common type of cell is the "Hooker" type of cell. Rather than having a plurality of cell units within a single housing, said cell units being divided into single cells, a Hooker cell, as the term is used herein, consists of three subassemblies, (1) an anode subassembly comprising a horizontal base wherein the anode blades are vertically mounted; (2) a cathode subassembly comprising a box-shaped metal shell open at the top and bottom and carrying elongated, hollow metallic cathode fingers, of wire screen and covered with asbestos fibers for example, and comprising means associated with said fingers and with said shell for withdrawing gaseous and liquid products of hydrolysis such as sodium hydroxide solution and hydrogen gas; and (3) a removable cover or top carrying means for feeding the anolyte such as aqueous sodium chloride and means for withdrawing chlorine or other gas.

Another aspect of this invention is the provision of the cathode fingers of a Hooker cell with improved current collecting and distributing means, as well as means for assembly and disassembly of said cathode unit, which means also provide a direct current path between the metal wall or shell (or a busbar attached thereto) and the wire screen or similar structure of the cathode.

The electrode assembly of the present invention is preferably used in conjunction with those cells having a metallic plate as the electrode support member, whether movable or fixed, and in the case of plural cells within a single housing, this member is suitably the cell divider or wall between single cells. In each cell unit, the graphite anode blades are individually embedded in a plurality of individual units of a readily fusible electrically conductive support material, such as lead, in such a manner that a direct current path is provided between anode blades and cathode fingers of the adjacent cell. Each anode blade and its support material is attached to the electrode support plate by a plurality of electrically conductive securing means, such as steel bolts, which are in electrical contact with the lead anode blade bases. Of course, each base is in electrical contact with the adjacent base. These securing means extend through the support plate in electrical contact therewith, and terminate in a conductive metallic current collecting and distributing strip, suitably of copper or steel, which extends in a substantially parallel relationship to the electrode support plate. This current collecting and distributing strip forms a support for the hollow cathode fingers, leaves or envelopes, and the screen forming the cathode compartment. Thus, the electrical energy distribution in this type of assembly is from the graphite anodes through the highly conductive lead support material, and then, directly via the steel bolts, to the metallic current collecting and distributing strip and the cathodes. The electrode support plate or wall and the anode blade bases assist in even distribution of the current. Additionally, the conductive strip functions to distribute the current evenly throughout the length of the cathode fingers so that the cathode is fully utilized.

In the case of a Hooker cell, said securing means are connected in electrically conductive relationship to the wall and/or external busbar of the cathode subassembly.

Another novel aspect of the cell of the present invention is the method used to collect and evacuate the cathodic gas from the cell housing. The bipolar electrolytic cells of the prior art have generally employed rather complicated means to collect and evacuate the cathodic gas. These means have involved the use of a complicated series of passageways in the cell housing and parts of the electrode assembly to a collection point outside of the cell housing.

The cathodic gas collection means employed in one embodiment of the cell of the invention is a rectangular box-like structure which is located atop the cathode compartment or catholyte compartment, of each of the assemblies. Thus, the cathodic gas collector is adjacent the cathode compartment and the cathode side of the electrode support plate. The gas collector structure is of sufficient volume to permit the gravity separation of the cathodic gas from the catholyte. The cathodic gas collector communicates with the interior of the cathode compartment and communicates with the exterior of the cell through either the removable cell cover or through a side of the cell housing.

The electrolytic cell of the present invention is particularly useful for the electrolysis of aqueous sodium chloride, wherein chlorine is liberated at the anode and hydrogen and aqueous sodium hydroxide are liberated or obtained within the membranes of the hollow cathode fingers.

The invention may be better understood with reference to the accompanying drawings and the following description.

Figure 7:
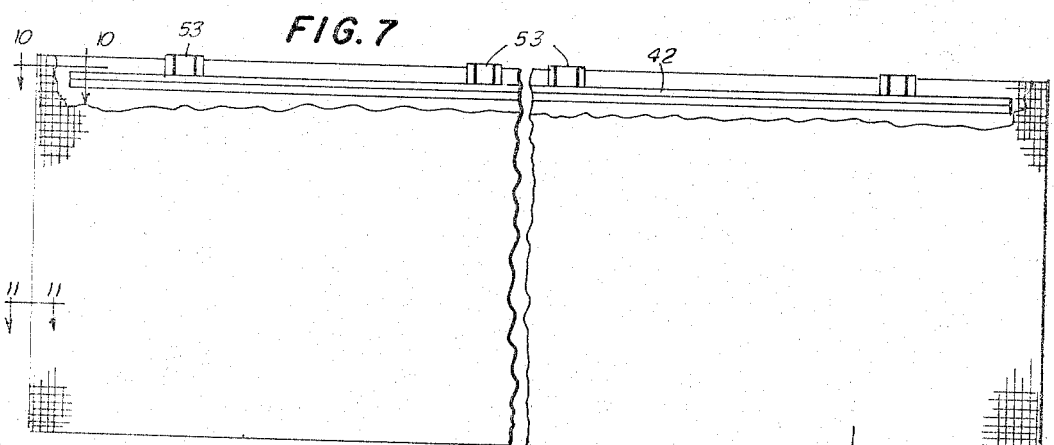
FIG. 7 is an elevation of a cathode finger partically cut away to show the conductive metallic current collecting and distributing strip.
Figure 8:
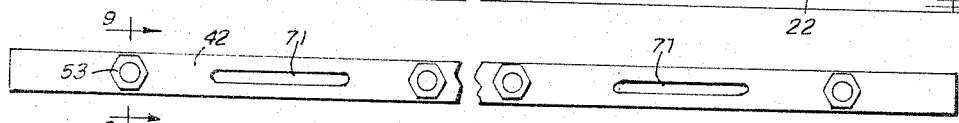
FIG. 8 shows the metallic conductive strip of FIG. 6 in detail.
Figure 9:
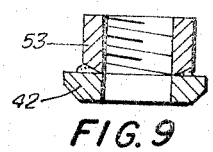
FIG. 9 is a section on line 9—9 of FIG. 8.
Figures 10, 11:
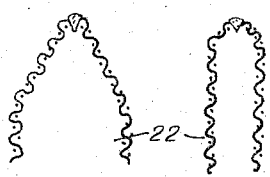

FIGS. 10 and 11 are sections on the lines 10—10 and 11—11 of FIG. 7, and show the closed end of the cathode finger.

FIG. 12 is a view partially in elevation, partially cut away, and partially in section of a further modification of tubular frame means for mounting the electrode support plate, showing the relationship between the cell housing and the gas and liquid outlets from the cathode compartment or chamber, and a portion of a cell divider atop the frame means.

FIG. 13 is a section on line 13—13 of FIG. 12 and shows the relationship of the anodes and the cathodes, electrode support plate, and further details of the means for withdrawing fluids from the cathode compartment.

FIG. 14 shows a modified electrode support plate and its relationship to the upper horizontal portion of the hollow tubular support means for the electrode support plate.

FIG. 15 is a view on line 15—15 of FIG. 12 and illustrates an embodiment of a nonconducting vertically disposed cell divider mounted atop the tubular frame.

FIG. 16 is a section on the line 16—16 of FIG. 12 and show further details of the vertical cell divider, the electrode support frame, means for maintaining the cell unit in upright position, and means for establishing a seal and electrical insulation between the electrode support frame, the tank bottom, and the outlets from the interior of the hollow frame.

FIG. 17 is a section on the line 17—17 of FIG. 16, and illustrates details of means for maintaining the cell unit in an upright position.

Figure 6:
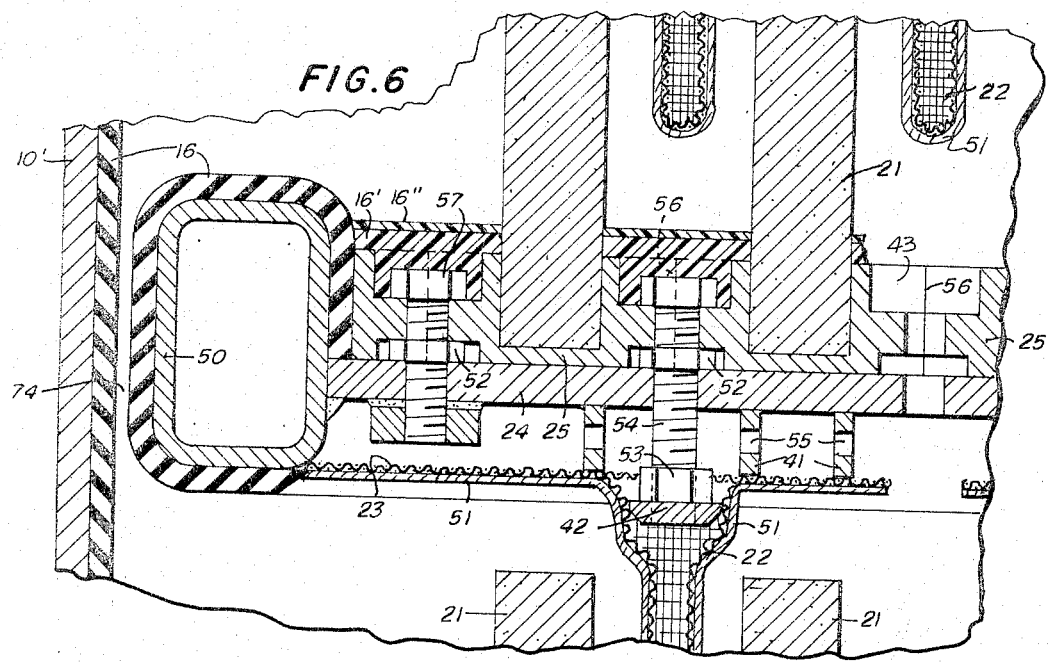
FIG. 6 is a partial sectional view on the line 6—6 of FIGS. 4 and 5 of a different embodiment of means for mounting the electrode support member than is shown in FIG. 2, and showing details of a fusible metal base for the anode blades and with further details of the means providing a direct connection and current path between the anodes of one cell and the cathode fingers of the next cell.
Figure 18:
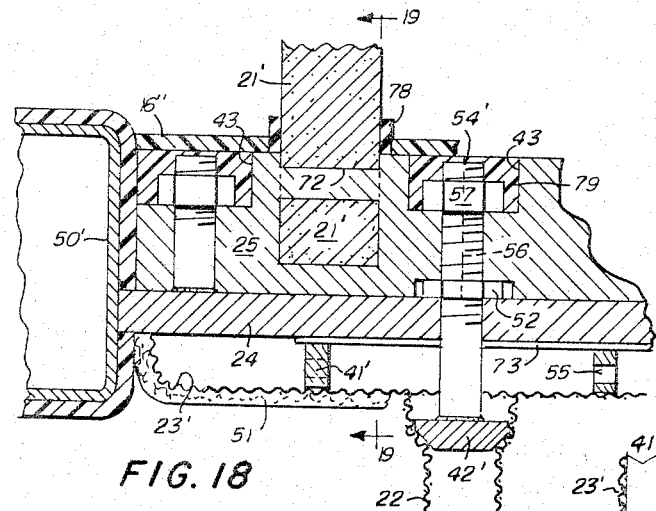
Figure 19:
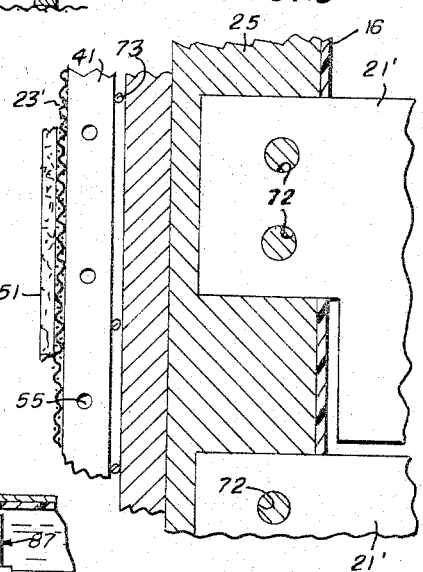

FIG. 18 is a section, similar to that of FIG. 6, showing means for supporting the anode blades, a modified means for connecting the anodes and cathodes of the cell unit and modified spacer means for spacing the cathode back screen from the electrode support plate. FIG. 19 is a section of the line 19—19 of FIG. 18, and shows further details of the features of FIG. 18.

Figure 20:
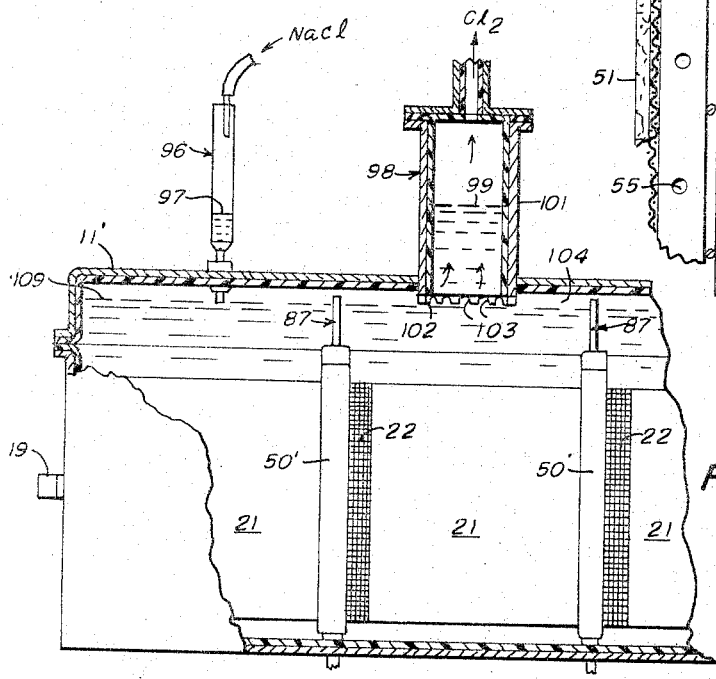

FIG. 20 is an elevation, with a side wall removed, of a plural cell assembly, containing elements shown in FIGS. 12 through 16, and also illustrating improved means for maintaining a hydraulic head in an electrolyte cell without the use of bulky, high-domed cells conventional in the art.

Figure 21:
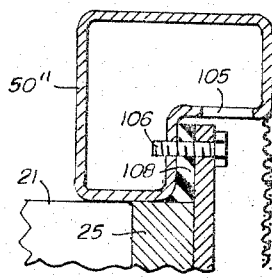

FIG. 21 shows another embodiment of the hollow tubular support means for the electrode support plate wherein the electrode support plate may be bolted to the hollow support, thereby avoiding the need for welding these two elements together.

Figure 1:
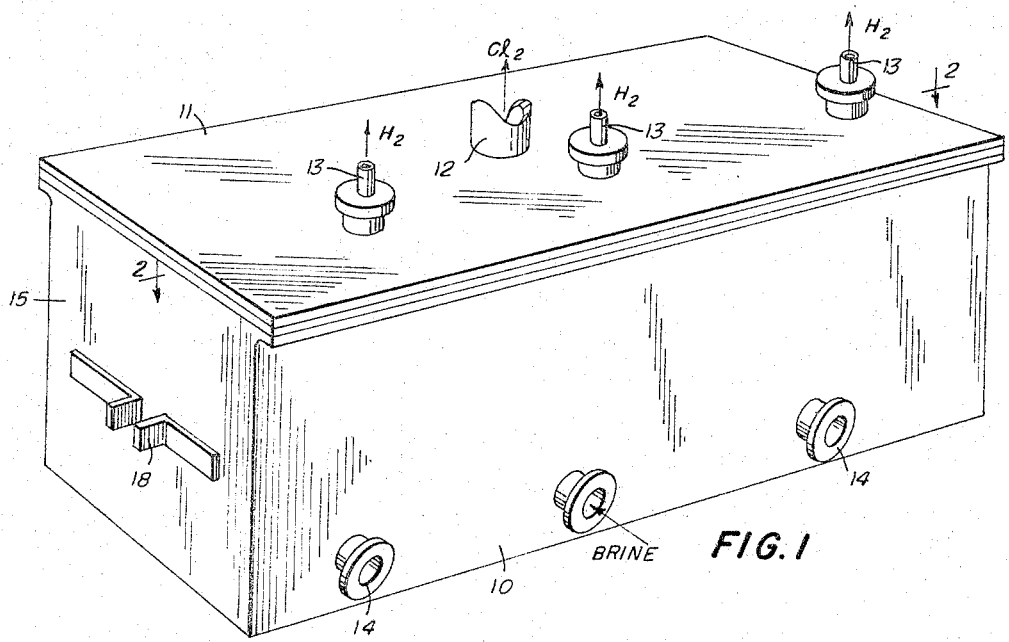
FIG. 1 is a perspective view of the exterior of the cell housing, showing the brine inlets to, and the hydrogen outlets from, each cell unit, the chlorine outlet, and one of the external busbar devices for connection to a source of electrical energy.

Referring to FIG. 1, the electrolytic cell series is housed in a rectangular, box-like housing or container 19 of concrete. The container has a removable top or cover 11, which may also conveniently be made of concrete coated with a nonconductive chlorine and brine resistant material such as a synthetic plastic or rubber, the latter being shown. The removable top has at least one outlet 12 for chlorine or anode gas and a plurality of outlets 13 for hydrogen or cathode gas. The number of hydrogen outlets will depend upon the number of single cells, three being shown. A plurality of brine inlet ports 14 are provided along one of the elongated sides of the cell housing 10. Again the exact number of inlet ports will depend upon the number of single cells. In this view the anode end 15 of the cell housing 10 is shown as is the external bus bar or anode terminal connector 18.

For purposes of illustration, the asbestos fiber or other equivalent material, forming the diaphragm over the pervious cathode fingers, is not shown.

Figure 2:
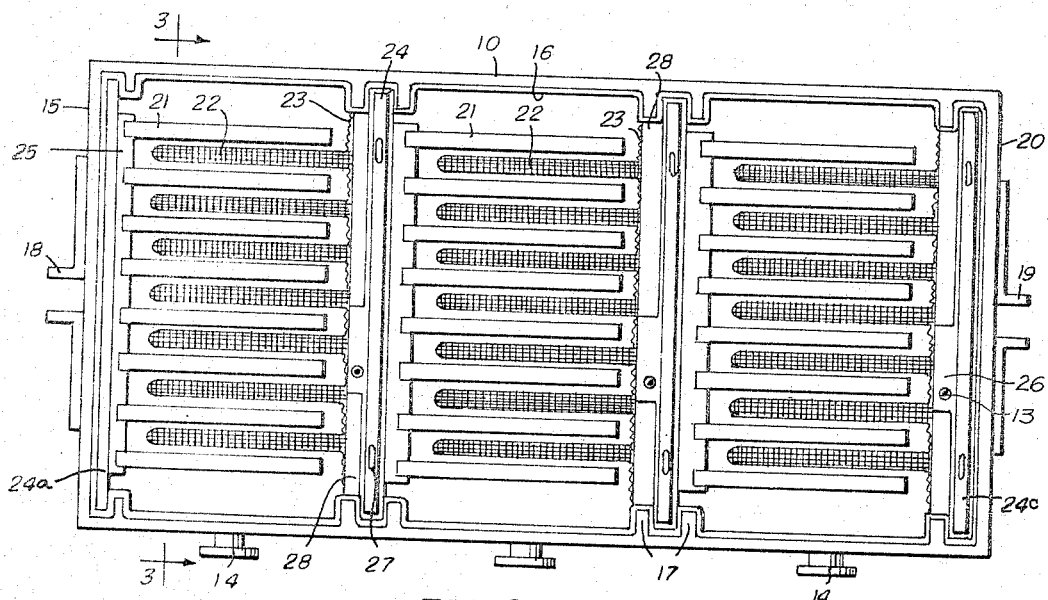
FIG. 2 is a section on line 2—2 of FIG. 1, showing one embodiment of the means for mounting the electrode support member.

In FIG. 2 the relationship between the cell housing, the single cells, and the cell units is shown. The cell housing 10 has an inner lining for example a polyester resin or a rubber protective coating 16. The side walls of the housing have vertical slots 17 formed therein which extend from the top to the bottom and which serve to position the electrode support member or plate 24, and thereby divide the housing into a series of single cells. The anode end 15 of the housing 10 has the anode terminal connector 18 affixed thereto, which connector is in electrical contact, by conventional means (not shown), to the electrode support plate 24a. The support plate is in direct contact with the anode blade support base 25. The cathode terminal connector 19 is affixed to the cathode end 20 of the cell housing and is electrically connected to the plate 24c which is in contact with the cathode screen 23 and the cathode fingers 22. Brine inlets 14 communicate between the outside of the cell housing and the interior of each of the single cells, between the anode blades and cathode fingers, to provide means for the introduction of fresh brine during electrolysis.

The interior of the housing contains a plurality of bipolar electrode assemblies which define the cell units making up the series of single cells. In the drawings, the series is shown as composed of three single cells, although a much larger number may be assembled in a similar fashion. Each cell unit electrode assembly comprises a plurality of graphite anode blades 21 in the form of vertical rectangular plates which extend from near one side of a rectangular steel support plate 24 perpendicular thereto, and a plurality of vertical cathode fingers 22 which extend perpendicularly from the cathode side of the plate 24. The anode blades 21 are mechanically secured to and maintained in electrical contact with the electrode support plate 24, by means of a conductive anode support material or base 25. The cathode fingers 22 are secured against and kept in electrical contact with cathode screen or back screen 23, and as shown in greater details in FIGS. 4 and 6, the cathode fingers 22 and cathode screen 23 are separate, together making up the cathode, and being held together by the force exerted by connecting means 54. Of course instead of being separate they may be integral. Cathode screen 23 in turn is in electrically conductive relationship to the support plate 24.

In each single cell, the cathode fingers 22 project into the pockets between the anode blades 21. Thus, each single cell is a pocket cell or interleaved cell as shown in FIG. 2. The space between the anode support material or base 25, the anodes 21, and the outer portions of cathode fingers 22 and the cathode screen 23, together with the diaphragm which covers the cathode, forms the anode compartment which, at all times during the operation of the cell, contains electrolyte. The space on the inner side of the diaphragm, of the cathode fingers 22, of the cathode screen 23, and of the cathode side of the cell divider plate forms the cathode chamber and, this chamber or compartment always contains electrolyte, in operation. As discussed below, the cathode fingers and the cathode screen are covered with a permeable diaphragm, suitably of nonwoven asbestos fabric, to prevent undue mixing of the catholyte and anolyte, and to allow for the collection of anodic and cathodic gases. A cathodic gas (e.g., hydrogen) conductor 28 communicates between the interior portion of each of the cathode fingers and the cathodic gas or hydrogen collector 26, thus providing means for the collection of the gaseous cathodic products. The cathodic gas or hydrogen gas collector 26 is provided with an outlet means 13 for removing the cathodic gas.

Figure 3:
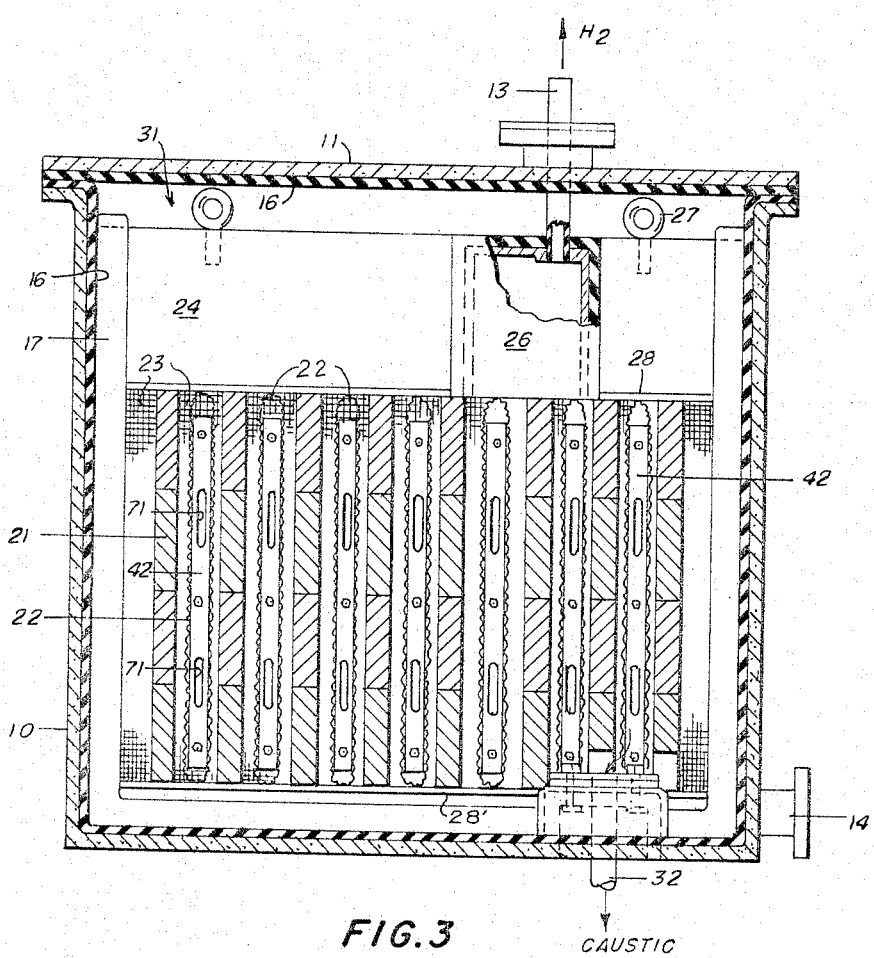
FIG. 3 is a section on line 3—3 of FIG. 2, showing the cathode compartment, the cathodic gas collecting means, and the catholyte outlet.

FIG. 3 shows a section on the line 3—3 of FIGS. 1 and 2 through a single cell, as viewed toward the cathode side of the cell divider and electrode support means. The cell housing 10 with its protective coating 16 is shown with the removable top or cover 11 and its protective coating 16 in position. The removable cover 11 has a cathodic gas outlet 13 which extends through the cover to the cathodic or hydrogen gas collector 26. The electrode support means 24 is shown positioned between the support grooves 17 on either side of the cell housing. The improved conductive metallic current collecting and distributing strips 42, having slots 71 therein for passage of the fluid products of electrolysis are positioned adjacent the open sides of the hollow cathode fingers. The conductive strips 42 are shown in greater detail in other figures of the drawings. A plurality of rubber-covered or plastic-covered lifting lugs 27 are affixed to the top of the electrode support plate to facilitate its positioning. A brine inlet 14 is provided in the side of the housing for the introduction of fresh brine during electrolysis. Caustic outlet 30 provides for the removal of the caustic solution formed during electrolysis. A more detailed relationship of the interleaved positioning of the anodes 21 and the cathode fingers 22 is shown, wherein the graphite anode blades each comprise four sections.

During the course of electrolysis, fresh brine is continually introduced into the cell through the brine inlet 14 and the brine level in the cell is kept above the top of the electrode assembly. The anodic gas or chlorine gas, which forms on the surface of the anode blades and is liberated during electrolysis, bubbles upwardly and collects in the free space 31 and above the electrode assembly, which is common to all of the assemblies in the cell. Thus, this common free space 31 serves as the anodic gas collector. The anodic gas is removed from the cell by means of the anodic or chlorine gas outlet 12 (shown in FIG. 1).

The brine gradually percolates or seeps through the permeable diaphragm of the cathode fingers and the cathode screen and thence comes into contact with the uninsulated side of the cathode. The cathodic gas formed in the cathode compartment diffuses upwardly and toward the rear of the compartment to the cathodic gas collector 26, 28, which is provided with an outlet means 13 for the removal of the cathodic gas from the electrode assembly. The solution of caustic, such as sodium hydroxide, formed under the influence of the electric current between the cathode fingers and the anode blades, flows downwardly and to the rear of the cathode compartment, and thence to the cell liquor outlet 30 which communicates with the interior of the hollow cathode fingers.

The cathodic gas collector 26 comprises a compartment or chamber, desirably rectangular in configuration, of sufficient volume to permit gravity separation of the cathodic gas from the cathodic liquid.

Figure 4:
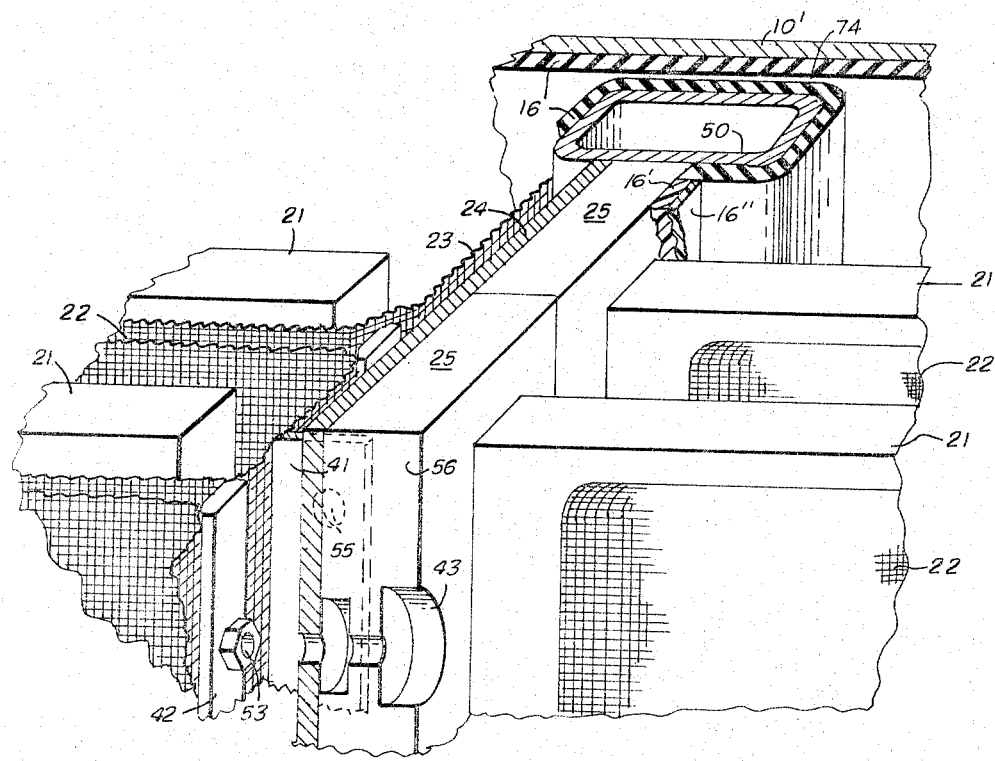
FIG. 4 is a perspective view of the preferred embodiment of the invention, partially in section, showing means for providing a direct electrical and mechanical connection between the anodes of one cell unit and the cathode of the adjacent cell unit.

Referring in detail to the bipolar electrode assembly or cell units as shown in FIG. 4, the assembly includes a flat rigid metallic electrode support plate 24, of steel or other electrically conductive structural material. The anode blades 21, which have previously been embedded in the anode bases support material 25, preferably by casting, are secured to the electrode support plate by a securing means (shown in FIG. 6) extending through the grooves 43. The anode electrodes are preferably composed of suitably impregnated graphite plates, blocks, slabs, or blades and the anode support material is preferably composed of lead or other suitable conductive low melting metallic material which is cast around the anodes, as has been suggested heretofore.

The cathode screen 23 is secured to the cathodic side of the electrode support plate 24 by a suitable means hereinafter described, and is spaced from the electrode support plate by means of spacers 41 having openings 55 therein for passage of the catholyte and cathodic gas. Attached to the cathode screen are the metal mesh cathode fingers 22. The cathode fingers are so mounted, in relation to the electrode support 24 and the anodes 21, that they register with the spaces between the anodes 21, with the holes 43, and with the joints or shoulders 56 between anode bases 25. The cathode fingers 22 are hollow and rectangular, and comprise two parallel, spaced flat sides, with three edges of said sides being joined and the fourth edge of each side cooperating to define an opening. The cathode fingers are secured, as by welding, brazing, or even by a press fit, to conductive metallic current collecting and distributing strips 42, each cathode finger having such a strip 42 located between opposed faces of the finger in the open edge, and which strips are in electrical contact with the anode support material 25 by means of bolts 54. Thus, the strips 42 not only serve as a base support for the cathode fingers, but, more importantly, serve to distribute the current evenly with low resistance throughout the cathode fingers. The conductive strips 42 are made of steel, copper, or other suitable low resistance material.

Figure 5:
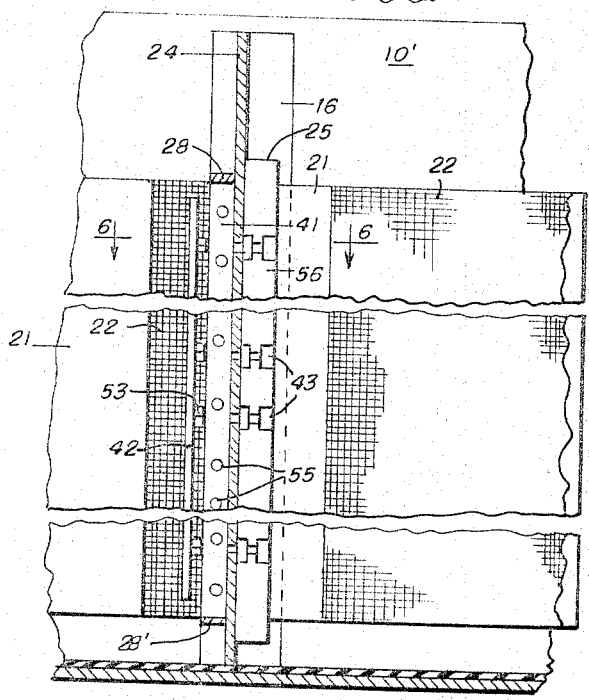
FIG. 5 is a partial sectional view of the line 5—5 of FIG. 4 of the preferred embodiment of the invention, in elevation, further showing the means mentioned in relation to FIG. 4.

In FIGS. 4, 5, and 6 the relationship between the electrodes, the planar electrode support plate and the cell housing is shown in more detail. In making the integral subassembly of the graphite anode blades 21 and the lead blade support base 25, the base is cast around the blades from molten lead or equivalent material. Examples of other suitable materials are the low-melting alloys principally of lead with small amounts of tin and/or antimony, such as type metal. For strength and ease of casting, a lead-antimony eutectic (10–11% antimony) is preferred. Alternatively, the lead is poured, then the blades are held in position until the metal has solidified. The mold is preferably of a configuration to provide semi-cylindrical grooves 43 which, when two cast bases are placed side-by-side, provide bolt holes along the abutting edges 56. If needed, lifting lugs may be embedded in the lead during casting or may be screwed into the lead or otherwise attached, subsequent to casting. An important feature of the invention is that a plurality of lead bases 25, each containing anode blades, are provided for each cell unit.

A space 74 defined by the insulation covering posts 50 and wall 10′ is a safety feature which permits anolyte to flow between adjacent cells in the event the means for feeding brine to an individual cell becomes clogged or non-operable for some reason. This safety feature prevents damage to the electrodes which would occur in the event the anolyte level dropped in a given cell and also provides for a uniform level of anolyte in all of the cells. This space obviously is proportioned so that a minimum loss of current efficiency is suffered.

To facilitate disassembly of the anode side of the cell unit, a chemical resistant but mechanically weak or frangible, but flexible, organic sealant such as asphalt or flexible polyester is applied to overlie the fastening means 57 and lead bases 25. A chemically resistant and mechanically strong resilient layer of a synthetic resin such as rigid polyester resin is then applied as a thinner layer 16″.

In assembling the cell unit, with the cathode screen, the cathode fingers, and the current collecting and distributing strips 42 carrying nuts 53 in place, the steel (copper or any alkali-resistant material is useful) bolts 54 are inserted through the holes in the electrode support plate, and are screwed into the nuts 53. The retaining nuts 52 are then drawn tight over the bolts on the anode side of the electrode support plate, and an anode blade support base 25, of course with the blade or blades 21 embedded therein, is lifted into place, and the base-holding nuts 57 are drawn up loosely. The next anode blade subassembly is then slid in place, and the loose nuts 57 drawn up snugly. Of course more than one anode blade subassembly may be placed at one time, and this is necessary if the last subassembly put in place fits snugly.

Thus, the steel bolts, the current collecting and distributing strips, and the nuts serve not only to hold the electrodes in place, but of perhaps greater importance, provide a highly efficient means for passing electrical current between adjacent single cells. The current is conducted between the anode blades 21 and the lead bases 25, between the lead bases and the connecting bolts 54, between the connecting bolts 54 and the nuts 53 and the conductive strips 42, and finally between these strips and the bases of the cathode fingers. Accordingly, the current flow is in a straight, low resistance path, and is distributed evenly over a wide area of the cathode fingers of the cell unit through the metal strips 42 which are placed between opposing interior surfaces of the bases of the cathode fingers.

The cathode screen 23 is welded or otherwise suitably secured to the steel support frame 50 in the embodiments shown in FIGS. 3 and 6. Electrode support plate 24 also is welded to the support frame. The steel support frame is preferably in the form of a hollow tube or post which may extend outwardly from both the anode and cathode sides of the electrode support plate, as is illustrated in FIGS. 4, 5, and 6. These posts may be fixedly mounted in the housing, or may be removably mounted in sockets in the bottom of the housing. That portion of the support frame 50 which is exposed to brine or chlorine during operation of the cell is covered by a protective coating 16 of inert material, such as a rubber or a synthetic resin coating. The steel support frame fits in close proximity to the walls of the cell housing 10, which is also covered with a protective coating 16. As may be noted, the hollow tubular support frame 50 is still another embodiment of electrode support plates mounting means, and which differs from that shown in FIG. 2, for example.

The cathode fingers 22, which are welded or otherwise secured to the current conducting strip 42, are also secured to the cathode back screen 23. The cathode screen 23 is generally planar and is spaced from the plate 24 by means of spacers 41, which spacers are perforated to allow for the free flow of electrolyte. The space defined by the support plate 24 and the cathode back screen 23 communicates with the interior of the cathode fingers 22, and may be defined as the catholyte compartment. This compartment directly communicates with means for withdrawing gas and liquid. The back screen 23 is provided with holes through which the bolts or studs 54 extend. The outer sides of the cathode fingers 22 and the cathode screen 23 are covered with a permeable diaphragm 51.

The permeable diaphragm 51 of each unit cell preferably is formed by placing or by depositing a coating or sheet of asbestos fibers on the brine side or outer sides of the cathode fingers 22 and of the cathode screen 23. This diaphragm may be formed from the asbestos particles or fibers by inserting the fingers and cathode screen into a slurry of the asbestos material and then depositing the material onto the mesh surface under vacuum. Alternatively the permeable diaphragm may be made by covering the back screen and pocket cathodes with one or more layers of asbestos paper. Other inert fibrous materials are of course useful.

FIGS. 7 through 11 show further details of the cathode finger subassembly including the relationship between the metal mesh cathode 22, the conductive strips 42 and the support nut 53. Thus, the metal mesh screen is folded to form a narrow trough-like pocket open along three sides. The opposed open sides are closed as by welding, as may be seen in FIGS. 10 and 11. The finger is of approximately the same height as the anodes. The finger is secured along its open edge or base to the elongated conductive strip 42 which extends nearly the full length of the open edge, the flat side of the conductive strip being parallel to the open side of the cathode finger, with the long edges of the strip being held between opposing inner surfaces of the cathode fingers. Each conductive strip 42 has a plurality of circular holes with nuts 53 affixed thereto, as by welding, to register with these holes and with the steel bolts 54 used to secure the cathode finger to the electrode support plate 24. Each of the conductive strips 42 also has a plurality of elongated holes 71, to allow for circulation of the liquid catholyte and cathodic gas, further passage being provided around the ends of the strip since it is slightly shorter than the cathode finger. This entire cathode assembly need not be made of wire screening or iron or other material, but may, of course, be constructed of perforated sheet iron or other suitable foraminous material which is the substantial equivalent of screening.

As suggested above, where the cathode is formed of a single piece of screening it is preferably folded. The fold may be parallel to the current collecting and distributing strip or alternatively the fold may be perpendicular to the current collecting and distributing strip. By "folding" is meant bending the screen fabric about a radius of a desired dimension, for example between about one-fourth inch and one inch. As has been suggested, the current collecting and distributing strip, which carries means for securing the cathode finger elements in place, is preferably located only in the base or open side of the cathode finger. Thus, the primary function of said strips is not for the purpose of preventing collapse of the walls of the finger during the period when the interiors of the fingers are being subjected to a subatmospheric pressure while membrane forming fibers are being deposited on the outside portion of the cell fingers, but rather to provide efficient current flow and to facilitate assembly of the apparatus.

FIG. 12 illustrates a diaphragm cell including a container or housing 10′ having an insulating nonconductive lining 16, and which is adapted for a plurality of cells. The view is toward the cathode side of a cell unit with the anode blades of the adjacent cell unit removed for clarity of illustration. Also for convenience of illustration the asbestos or other diaphragm-forming material is omitted and only two cathode fingers are shown. An endless tubular frame 50′ is mounted in the housing, the housing being shown only in part. This frame is generally rectangular in outline, and contains a liquid outlet 84 and a gas outlet 83, a suitable wall 81 serving to divide the gas and liquid collecting areas within the tube. The electrode support plate 24 is mounted on said frame, and mounted upon said support plate is cathode back screen 23 and cathode fingers 22. The space bounded by said cathode fingers, said cathode screen and said plate defines a catholyte compartment. At the inner periphery of said frame, openings 76 are provided adjacent the top of plate 24 for the withdrawal of gas from the catholyte compartment and at the bottom of said periphery openings 77 are provided for the withdrawal of liquid electrolysis product. A baffle 80 extends upwardly for a short distance in the interior of the upper part of the hollow frame and said baffle serves to prevent the flow of liquid into the gas collecting space and gas outlet 83.

Elongated conductive electrical current collecting and distributing strips 42′ are mounted in the open base of each cathode finger 22 (also shown in greater detail in FIGS. 6 and 18). As shown, these strips terminate short of the upper and lower extremities of the fingers, thus providing means for the flow of gas and liquid from the interior of the cathode fingers.

A space 74 is provided between the frame element and the wall of the cell of a dimension up to about one-fourth inch; where the frame is several inches thick, such as space provides little loss of current efficiency between adjacent cells, but provides an important safety feature in that anolyte may seep from one cell to the next in the event means for feeding anolyte to each cell becomes clogged or otherwise inoperative. This feature avoids destruction of cathode screen 22 and cathode fingers 22 which may occur when a given single cell becomes depleted of liquid anolyte.

Mounted atop the endless tubular frame is a means 87 which provides a corrosion resistant nonconductive cell divider, suitably of a synthetic polyester resin reinforced with glass fibers, having a vertical fin 88, and a chamber 89 as well as horizontal flanges 90 (see also FIGS. 15 and 16). Attached to the upper portion of the outer periphery of the frame 50′ are lifting studs 82, suitably attached to the frame as by welding. Studs 54′, shown in section at the face of the plate, hold the anodes and cathodes in back-to-back relationship.

In FIG. 13, the overall assembly of the cell unit becomes apparent, with the anode blades 21′ being mounted on one side of the planar support member 24 and the cathode fingers being mounted on the other side thereof. The remaining features of FIG. 13 are similar to those of FIGS. 6 and 12.

While the foregoing shows details of specific embodiments of tubular supports, it will be apparent that the electrode support plate could be carried in or associated with a single, straight tubular element in a horizontal position, the ends being in sockets on the housing walls. Similarly, the invention includes a tubular frame in the form of an upright or inverted U mounted similarly to the frame of FIG. 12, and other such modifications.

In FIG. 14, the electrode support plate 24′ is shown with a bent portion or offset flange 78 thereby providing space for a fastening strip 109 for securing the rubber lining or protective coating to the inner periphery of the frame 50'.

FIGS. 15 and 16 show details of the cell divider as described in connection with FIG. 12. FIG. 16 also shows a protective cap 86 of rubber or other material which is placed over the lifting studs 82. Another feature shown in FIG. 16 is a nonconductive sleeve 85 lining the opening in the bottom of the cell housing, thereby providing a liquid seal and electrical insulation between the bottom of the hollow tubular frame and the bottom of the chamber. Rectangular, rubber or plastic covered metal blocks 91 shown in FIG. 17, are attached to the wall 10' of the cell housing for the purpose of holding the cell units in an upright position.

While FIG. 18 has some similarity to FIG. 6, it shows modifications of connecting means between the back-to-back anode blades and cathode fingers of a cell unit and other modifications which will now be described. The following is also applicable to FIG. 19.

The modified means 54', for connecting the anode blades and cathode fingers in back-to-back relationship with a planar support 24 therebetween, is unitary with the elongated currect collecting and distributing strip 42' and with cathode fingers 22. As indicated above, the current collecting and distributing strip is resistance-welded to the open edge of the cathode fingers, the cathode finger generally being rectangular in shape and the other three edges being closed.

A modified spacer means 41', 73, for spacing the back screen 23' from the support plate 24, comprises metallic bars 41' resistance-welded to spacer rods 73. In assembling the cathode elements, the grid comprising bars or straps 41' and rods 73 is simply placed on the supporting plate 24 (which has previously been secured to a tubular member 50'), the back screen having previously been provided with openings for studs 54', and the unitary assemblies of screen fingers 22, conductive strips 42' and studs 54' are then placed in the relationship shown in the drawing. Thus, when the apparatus is disassembled to replace either a back screen or some of the cathode fingers, it is unnecessary to destroy the entire device or to go through complicated procedures of cutting out individual cathode fingers. Of course, after the cathode fingers and back screens are secured in place, a coating of asbestos or other membrane material is applied.

Holes 72 are preferably provided in anode blades 21' at a point adjacent the upper surface of the lead bases 25, thereby keying the metallic lead on each side of blades 21' together, so that when the nuts 57, on the studs connecting the anode and cathode elements, are tightened the lead does not pull away from the anode blades at the surface of the lead. Also, an increased area of electrical contact is provided. Since the lead or other equivalent metal at the time of casting it around the anode blades is molten, it undergoes a phase of contraction during cooling, the result being that in use in the cell, the lead does not contract to such a point that the anode assemblies are misaligned. In connection with the problem of expansion or contraction, an important feature of the invention as suggested elsewhere herein is the provision of a plurality of anode support bases 25 across the width of the cell with small clearances therebetween whereby in operation at elevated temperature expansion and contraction of the anode bases is in small increments.

FIG. 20 demonstrates the embodiment of the invention making it unnecessary to have large bulky domes or covers over electrolytic cells. This embodiment of the invention provides for the application of an adequate hydrostatic head of electrolyte while making it possible to utilize relatively compact cell covers and at the same time requiring a minimum of materials in the construction of said covers. Cover 11' is provided with a gas and liquid separator 98. The gas and liquid separator is enclosed by upstanding walls 101 extending above the cover 11' and is also provided with means for conducting gas therefrom. The gas collector 98 terminates below the lower surface of cover 11', a portion of separator wall 101 extending downwardly a short distance, for example one to six inches, and terminating at that point to provide a downwardly extending wall 102. Desirably, the downwardly extending wall 102 is provided with notches or serrations 103. Corrosion resistant nonconductive cell separators 87 extend vertically to a point short of the underside of the cover 11' and to a point such that a horizontal line from the top of the cell separator intersects the lower portion 102 of the gas separator 98 at a point above the bottom edge thereof and above the uppermost portions of any serrations or indentations 103 provided in the lower edge of the gas separator.

The cover 11' is also provided with conventional anolyte feeding means 96, each of the single cells within the cell housing being provided with such anolyte supplying devices. In operation, the anolyte level 109 in each of the individual cells is maintained below the top of cell separator 87, thereby minimizing current loss between cells. The level of the anolyte 97 in the anolyte feeding means 96 is maintained at a point such that the anolyte level 99 is within the liquid and gas separator 98. This construction therefore maintains a desirable hydrostatic head upon the anolyte within the cells of the cell series. The space between the liquid surface or level 109 and the cover provides a gas pad or space 104 for direct passage of gas from each cell to the gas and liquid separator 98.

This figure also shows in part other elements of the cell series including support frames 50', cathode fingers 22, anode blades 21, an external busbar 19 which is in electrical connection with the cathodes of that end of the cell series. As will be understood in the art, but not shown herein, suitable means provide electrical insulation between the opposite ends of the cell series so that current flow is from one cell to the next.

A modification, shown in FIG. 21, of the hollow tubular frame for supporting electrode support plate 24, is also provided according to the invention. As illustrated, the tubular frame (sans protective coating for illustrative purposes) is formed so that it has a generally L-shaped cross section. This permtis bolting the electrode support plate 24 directly to the tubular frame member thereby avoiding the necessity for welding these two elements together. Stud 106 is utilized to tighten the plate 24 against the L-shaped tubular member 50'', a suitable sealing gasket being placed therebetween.

FIGS. 22, 23, and 24 illustrate modifications of the invention adapted to what is known in the trade as a "Hooker" type cell. Such cells conventionally comprise insulating members 204 mounted on the floor 205 which support a base and anode subassembly 203. Mounted upon the anode subassembly is a cathode subassembly 202 comprising a metal box-like shell 216 open at the top and bottom. A suitable sealing gasket 210 is placed therebetween. Another insulating and sealing gasket 210 is placed upon the cathode subassembly 202, and a cover 201, which conventionally carries lifting lugs, brine feeding means 207 and a chlorine outlet 206, is mounted upon the cathode subassembly. The cover and base are suitably made of stoneware or concrete. While not illustrated, it is within the purview of the invention to provide or to substitute a cover of the nature shown in FIG. 20, and described above, for the cover 201 of FIG. 22.

An especially important feature of the present invention as applied to a Hooker type cell is a novel means for providing electrical connection between the cathode finger 211 and the wall portion 216 of the cathode subassembly. While this embodiment of the invention is somewhat similar to the embodiments shown in the connection with FIGS. 1 through 21, notable differences will be apparent. Thus, the cathode subassembly is distinct and apart from the anode subassembly, which requires modifications in the means for attaching the cathode fingers to the shell forming the wall of the cathode subassembly. Such means include elongated electric current collecting and distributing strips 218 mounted along the open edge of cathode fingers 211, the other three edges of these hollow cathode fingers being closed. As in the apparatus described above, the cathode fingers may be of screen or other pervious conductive material, and they are covered with a diaphragm-forming material such as asbestos fibers.

A modification shown in FIG. 22, which is equally adaptable to the invention shown in the other figures herein, is in connection with the orientation of the weft and warp strands of wire in relation to the horizontal. The cathode finger is formed in such a manner that these strands are at an angle to the horizontal, preferably at an angle of about 45°. As will be apparent, both warp and weft strands will be in contact with the current collecting and distributing strip 218, and at an angle in relation thereto of less than 90°. One method of assembling the screen cathode finger of the invention (see for example FIGS. 7, 10, and 11) mentioned above is to fold an elongated piece of screen material to form three open edges, followed by closing two of these edges, then securing the elongated collecting and distributing strip 42, or 218, between the opposed faces of the remaining open sides. As shown in FIGS. 10 and 11 the opposed open sides may be closed by welding or other suitable means. In the case of a piece of wire fabric cut in such a manner that both warp and weft strands are in contact with the current collecting and distributing strip, it will be apparent that the weld or other means securing the open edges together will contact diagonal wires which are in contact with the conductive strip. Thus further distribution of the current along the weld or seam to other diagonal wires on both sides of the cathode finger will take place. This feature is valuable where the dimension from the open side of the cathode finger to the opposed closed end is equal to or greater than the dimension along the open side of the cathode finger. In the cases where the distance from the open side of the cathode finger to the opposed edge of the screen is less than the distance along the open side thereof it will be apparent that in many cases a given wire secured to the current collecting and distributing strip will extend to and around the folded portion of the cathode screen, still further improving the current distribution. Such a diagonal arrangement of the screen wires in combination with the current collecting and distributing strip is also within the purview of the invention.

Since of course the Hooker type cell has a cathode subassembly which is separate from the anode subassembly, a somewhat different arrangement is required than is shown in the figures heretofore described. The current collecting and distributing strip 218 is suitably integral with the studs 219, the two being secured by resistance welding or other means, and the studs 219 extending through the metallic wall 216. Spacer elements 221, 222, similar to those shown in FIG. 18 (although elements similar to those shown in FIG. 6 would be suitable), are used to space the cathode back screen 224 from the cell wall 216. Since the current collecting and distributing strip 218 is secured between the opposed faces of the open side of the cathode finger 211, the cathode finger serves to assist in retaining the cathode back screen 221 in fixed relationship to the cell wall. Suitable means for securing the stud 219 are shown in FIG. 22 and the means shown includes a nut 223 and a conductive washer 220, made of soft lead for example. Such an arrangement provides direct electrical communication with the cell wall 216 and accordingly the current flow is from the busbar 225 through the housing wall 216 to the securing means 219, 220 to the current collecting and distributing strip 218 and thence to the cathode fingers 211, and screen 224. As may be seen, the cathode back screen together with wall 216 forms a catholyte compartment. A suitable organic sealant 213 is of course placed over the conductive portions of wall 216 not within the catholyte compartment and over anode support material 214. The cathode compartment formed by cathode back screen 224 and the cell wall 226 serves to collect the gaseous and liquid products from the interiors of the cathode fingers whence the gaseous product is withdrawn through conduit 208 and the liquid product is withdrawn through conduit 209.

FIG. 23, which is a section on the line 23—23 of FIG. 22, illustrates further the relationship between the anode blades 212 and the cathode fingers 211, the asbestos coating 226 being shown. All parts of the metal cell wall not within the cathode chamber or compartment are suitably protected by an organic corrosion resistant and nonconductive material 213. The description in connection with FIG. 22 is equally applicable to FIG. 23 for the parts which are shown.

As shown in FIG. 24, if desired, the busbar 225 may be continued around the sides of the cell as shown and may be shaped or located in such a manner that the securing means 219, 220 come into direct contact with busbar 225.

The foregoing describes the presently contemplated preferred embodiments of the invention but it will be apparent to one skilled in the art that alternatives and equivalents may be utilized. While the description is directed primarily toward the electrolyses of aqueous sodium chloride solutions other alkali metal salts, particularly the halides, may be electrolyzed in the apparatus of the invention.

We claim:
1. A diaphragm type of cell series comprising:
a rectangular box like cell housing having a removable cover,
said cell housing having a plurality of pairs of opposed support means adjacent the interior walls of the elongated sides of said housing intermediate the ends thereof,
each of said pairs of intermediate opposed support means having a bipolar cell unit mounted therebetween,
said bipolar cell units comprising an electrode support plate having a plurality of anode blades extending from one side thereof and a cathode having a plurality of pervious hollow cathode fingers opening into a cathode compartment substantially coextensive with said support plate and extending from the opposite side thereof,
said opposed support means being so positioned in said cell housing that said cell units mounted therebetween have the anode blades of one unit extending between cathode fingers of the adjacent cell unit,
said electrode support plate and said cathode compartment having a rectangular box-like cathodic gas collector secured thereto, within said cell housing, and in connection with said cathode compartment,
said cathodic gas collector extending upwardly in a substantially parallel relationship with said support plate and said cathodic compartment,
said cathodic gas collector being located substantially intermediate the horizontally spaced extremes of said electrode support plate and substantially intermediate the horizontally spaced extremes of said cathode compartment,
said cathodic gas collector being in communication with the exterior of said cell housing,
said cell housing having a partial electrode assembly positioned adjacent each interior end wall,
one of said partial electrode assemblies having anode blades extending therefrom and extending between the cathode fingers of the bipolar cell unit which is adjacent thereto,
the other of said partial electrode assemblies having a cathodic compartment and having cathode fingers extending therefrom and positioned between the anode blades of the bipolar electrode assembly which is adjacent thereto,
means for introducing a liquid to be electrolyzed into said cell housing, means for conducting the liquid and gaseous cathodic reaction products from said cathodic compartment and from the cell housing, and means for applying suitable electrical potentials to said partial electrode assemblies.

2. A cell series of the diaphragm type comprising:

a rectangular box-like cell housing having a removable cover, said cell housing having opposed pairs of support means adjacent the interior walls of the elongated sides of said housing, each pair of said opposed support means having a bipolar cell unit mounted therebetween, each of said bipolar cell units comprising an electrode support plate having a plurality of conductive anode blades extending from one side thereof and a plurality of hollow cathode fingers opening into a cathode compartment substantially coextensive with said support plate and extending from the opposite side thereof, said plurality of anode blades being embedded in individual units of electrically conductive support material, said individual units of support material being mechanically secured to said electrode support plate by a plurality of electrically conductive securing means extending through said electrode support plate and through said cathode compartment, terminating in an electrically conductive and mechanically secured relationship with elongated, conductive, metallic current collecting and distributing strips, said conductive strips extending in a substantially parallel relationship to said electrode support plate and forming the base support members for said cathode fingers and being fixed between opposing inner faces of said cathode fingers, said opposed support means being so positioned in said cell housing that said cell units mounted thereupon have the anodes of one unit interpositioned with the cathode fingers of the adjacent assembly, said electrode support plate and said cathode compartment having a cathodic gas collector secured thereto, within said cell housing, said cathodic gas collector being in communication with the exterior of said cell housing, said cell housing having a partial electrode assembly positioned adjacent to each interior end wall of said cell housing, one of said partial electrode assemblies having anode blades extending therefrom positioned between the cathode fingers of the bipolar cell unit which is adjacent thereto, the other of said partial electrode assemblies having a cathode compartment and cathode fingers extending therefrom positioned between the anode blades of the bipolar cell unit which is adjacent thereto, means for introducing electrolyte into said cell housing, means for conducting the liquid cathodic and gaseous reaction products from said cathodic compartment and from the cell housing, means for conducting the anodic gases from the cell housing, and means for applying suitable electrical potentials to said partial electrode assemblies.

3. A diaphragm type of cell series comprising:

a rectangular box like cell housing having a removable cover, said cell housing having opposed pairs of support means adjacent the interior walls of the elongated sides of said housing, each of said opposed pairs of support means having a bipolar cell unit mounted therebetween, said bipolar cell unit comprising an electrode support plate having a plurality of anode blades extending from one side thereof and a plurality of hollow, pervious cathode fingers opening into a cathode compartment substantially coextensive with said support plate and extending from the opposite side thereof, said opposed support means being so positioned in said cell housing that said cell units have the anode blades of one assembly positioned between the cathode finger of the adjacent assembly, said plurality of anode blades being individually embedded in individual units of electrically conductive support material, said individual units of support material being mechanically secured to said electrode support plate by a plurality of electrically conductive securing means extending through said electrode plate support and said cathode compartment and terminating in an electrically conductive and mechanically secured relationship with an elongated, conductive metallic current collecting and distributing strip, said conductive strip extending in a substantially parallel relationship to said electrode support plate and forming the base support member for said cathode fingers, said electrode support plate and said cathode compartment having a rectangular box-like cathodic gas collector secured thereto, within said cell housing, and in communication with said cathode compartment, said cathodic gas collector extending in a substantially parallel relationship with said electrode support plate and said cathode compartment, said cathodic gas collector being located substantially intermediate the horizontally spaced extremes of said electrode support plate and intermediate the horizontally spaced extremes of said cathode compartment, said cathodic gas collector being in communication with the exterior of said cell housing, said cell housing having a partial electrode assembly positioned adjacent to each interior end wall of said cell housing, one of said partial electrode assemblies having anode blades extending therefrom positioned between the cathode fingers of the bipolar cell unit which is adjacent thereto, the other of said partial electrode assemblies having a cathode compartment and cathode fingers extending therefrom positioned between the anode blades of the bipolar cell unit which is adjacent thereto, means for introducing electrolyte into said cell housing, means for conducting the liquid cathodic and gaseous reaction products from said cathodic compartment and from said cell housing, means for conducting the anodic gas from the cell housing, and means for applying suitable electrical potentials to said partial electrode assemblies.

4. An alkali chlorine cell series of the diaphragm type comprising:

an elongated, enclosed housing having at least one pair of opposed support means adjacent the side walls of said housing and spaced intermediate the ends thereof, said opposed support means having a bipolar cell unit mounted therebetween, said cell unit comprising a rectangular steel electrode support plate, having holes therein for engagement with electrode mounting means, the horizontally extreme ends of said electrode support plate being in engagement with said pair of opposed support means, a plurality of narrow, elongated vertical graphite anode blades mounted perpendicularly to said electrode support plate and embedded in a plurality of individual mounting bases of a low-melting metal composed at least principally of lead, said bases being provided with vertical shoulders extending horizontally beyond said anode blades, each shoulder having generally semicylindrical grooves matched with corresponding grooves in adjacent bases whereby each set of matched grooves provides a hole for engagement with electrode mounting means, each hole being aligned with said holes in said electrode support plate, a plurality of narrow, elongated, vertical, hollow cathode fingers constructed of metal mesh mounted in spaced relation to said electrode support plate perpendicularly thereto on the side thereof opposite said anode blades, each of said cathode fingers having an open base extending toward said electrode support plate, a metal mesh cathode screen joining each of the bases of said cathode fingers, said cathode screen being parallel to and spaced from said electrode support plate, thereby providing a cathode compartment between said cathode screen and said electrode support plate and substantially coextensive therewith, said open bases opening into said compartment, a porous diaphragm disposed over said cathode fingers and said cathode compartment, a vertical conductive, elongated, current collecting and distributing strip fixedly mounted in the base of each cathode finger between opposing inner faces thereof, said conductive strip providing openings for free flow of cathodic fluids between the interior of said finger and said cathode compartment, said conductive strip having means aligned with said holes in said electrode support plate for engagement with electrode mounting means, a second set of vertical anode blades spaced from and extending between said cathode fingers, a second set of vertical cathode fingers spaced from and extending between said first-mentioned anode blades, electrode mounting means engaging said conductive strip and extending through said holes in said electrode support plate and through said holes provided by said anode blade bases, thereby providing a straight, low resistance path for electrical current between said anode blades and said cathode fingers of said bipolar cell unit, with uniform current distribution over a wide area of said cathode fingers, means associated with said cathode compartment for withdrawing cathodic gas, means associated with said cathode compartment for withdrawing cathodic liquid, means associated with said housing for withdrawing anodic gas, means associated with said housing for introducing a liquid to be electrolyzed between said spaced anode blades and said cathode fingers, and means for applying an electrical potential across said cell.

5. In a removable cell unit for an electrolytic cell which comprises a series of cells within a single housing, and wherein said cell unit contains anodes and hollow cathodes in a back-to-back relationship upon a generally rectangular planar support with means for conducting electricity between said anodes and said cathodes through said planar support, the improvement wherein said generally rectangular planar support is attached to elongated, parallel, hollow tubular support means, said attachment being adjacent parallel edges of said planar support, the interiors of said hollow cathodes being in communication with a fluid-collecting cathode compartment generally coextensive with said planar support, said cathode compartment being in fluid-conducting relationship to the interior of at least one of said parallel tubular support means, means for withdrawing fluid from said tubular support, and means associated with said housing for securing said cell unit in an operative position such that said planar support is vertical.

6. The cell unit of claim 5 in which said parallel tubular support means are vertical.

7. The cell unit of claim 5 wherein at least a portion of said tubular support means is horizontal.

8. The cell unit of claim 5 wherein said tubular support means is an endless tube forming a frame adjacent the periphery of said planar support.

9. The cell unit of claim 5 wherein the means for withdrawing said fluids is located adjacent the bottom of said cell unit.

10. The cell unit of claim 5 wherein an L-shaped flange forms a part of at least two edges of said planar support, the tip of the horizontal leg of said L-shaped cross-section being attached to said planar support, and the other leg of said L-shaped cross-section being attached to said tubular support means.

11. The cell unit of claim 5 in which said tubular supporting member is constructed in such a manner that said planar support means may be bolted thereto.

12. The cell unit of claim 5 in which said tubular support member is generally L-shaped in cross-section.

13. A cell unit for a diaphragm type of alkali-chlorine cell having a rectangular metallic electrode support plate with a plurality of elongated graphite anode blades embedded in a support material affixed thereto, said anode blades extending substantially perpendicularly from the anode side of said electrode support plate, and a plurality of hollow, pervious metal cathode fingers affixed thereto, said cathode fingers extending substantially perpendicularly from the cathode side of said electrode support plate, each of said electrode fingers having an open side spaced from and parallel to said support plate, wherein each of said graphite anode blades is embedded in individual units of electrically conductive support material, said individual units of support material being mechanically secured to said electrode support plate by a plurality of electrically conductive securing means extending through said electrode support plate and terminating in an electrically conductive and mechanically secured relationship with a conductive, metallic, elongated current collecting and distributing strip, associated with each cathode finger, said strip being flat, the long edges thereof being secured between the opposing inner surfaces of each cathode finger in said open side, a flat face of said conductive strip extending in a substantially parallel relationship to said electrode support plate, and to said graphite anode blades, and said conductive strip forming the base support member for said metal cathode finger and being integral therewith.

14. The combination of claim 13, wherein said plurality of graphite anode blades is composed of elongated rectangular sections of graphite embedded in individual sections of a lead support material, said lead support material forming a shoulder having a plurality of grooves on the elongated edges thereof as a means for mechanically securing said support material to said electrode support plate.

15. The combination of claim 14, wherein said grooves generally conform to the shape of the securing means.

16. The combination of claim 13, wherein said plurality of graphite anodes is composed of a plurality of elongated rectangular sections of graphite each embedded in individual sections of a lead support material, said lead support material forming a shoulder surrounding said graphite anode, said surrounding shoulder having a plurality of grooves in cooperation with corresponding grooves of abutting sections of lead support material forming passageways generally, conforming to the shape of the securing means, and through which said electrically conductive means extend.

17. A cathode element for use in an alkali-chlorine diaphragm cell, comprising a generally flat, rectangular, hollow cathode finger of wire mesh, closed on three sides and open on the fourth side, having a conductive, elongated current collecting and distributing strip fixedly mounted in said opening in electrical contact with the opposing inner faces of said cathode finger, said strip being flat, the long edges thereof being secured between the opposing inner surfaces of said cathode finger, and means on said conductive strip for securing said cathode finger in said cell.

18. A cathode finger for an electrolytic cell, said finger being in the shape of a flat hollow rectangular envelope closed along three edges and open on the fourth edge, comprising two spaced apart planar sides of metal wire fabric and having warp and weft strands, an elongated electrically conductive current collecting and distributing strip attached to said open edge in electrically conductive relationship with said warp and weft strands, said warp and weft strands being at an angle to said elongated strip of less than 90 degrees, said strip being flat, the long edges thereof being secured between the opposing inner surfaces of said cathode finger, and means on said conductive strip for securing said cathode finger in said cell.

19. The cathode finger of claim 18 in which said two parallel spaced apart sides are formed from a single sheet of wire fabric, and the edge opposite to and parallel to said conductive strip is closed by a fold formed in said sheet.

20. The cathode finger of claim 18 in which said parallel sides are formed from a single sheet of wire fabric and in which an edge adjacent to said open edge and perpendicular to said conductive strip is a fold formed in said fabric.

21. A cathode subassembly for an electrolytic diaphragm cell comprising a generally rectangular planar support means, said cathode comprising a plurality of metallic hollow cathode fingers pervious to electrolyte perpendicular to said planar support and spaced therefrom, a metallic cathode element pervious to electrolyte parallel to said planar support and between said cathode fingers, said cathode element being generally rectangular in shape, generally planar in form, located in a plane parallel to said support and together with said support defining a cathode chamber substantially coextensive with said planar support for receiving fluids from the interiors of said cathode fingers, means spacing said planar cathode element from said planar support, said cathode fingers and said planar cathode element being free of direct mechanical connection but being in contact with one another, each of said cathode fingers having three closed edges and an open edge facing said planar cathode member, a flat conductive elongated current collecting and distributing strip thereof being secured the long edges thereof being secured between the opposing inner surfaces of said cathode fingers, said cathode fingers having means for passage of fluid from the interior thereof to said cathode compartment, and means extending from said conductive strip securing said strip, said cathode fingers and said planar support in fixed relationship with said planar cathode member being fixed therebetween by contact with said open edges of said cathode fingers.

22. An anode element for use in an alkali-chlorine diaphragm cell, comprising a flat, elongated graphite anode blade embedded in a base of a low-melting metal consisting at least principally of lead, said base extending perpendicularly to said blade a short distance to provide a shoulder, and generally semicylindrical grooves spaced along the periphery of said base, thereby providing means for removably mounting said anode element.

23. An anode subassembly for an electrolytic cell comprising a conductive base and conductive chemically resistant anode blades extending therefrom, said anode base being covered by a layer of corrosion resistant protective organic sealant, the improvement comprising a first layer of mechanically weak and frangible organic sealant on said base, said first layer being provided with a second thinner top layer of resilient chemical resistant mechanically strong organic sealant, whereby disassembly of said cell is facilitated.

24. A cathode subassembly for use in a diaphragm type of electrolytic cell comprising a planar electrode supporting means, a plurality of hollow metallic pervious cathode fingers extending perpendicularly from said planar supporting member, each of said cathode fingers comprising a pair of flat spaced parallel walls, said walls being joined on three edges and open on the fourth edge, an elongated metallic electrical current collecting and distributing strip secured between the opposed interior faces of said cathode finger along said open edge, said strip being flat, the long edges thereof being secured between said opposed interior faces, means associated therewith for the free passage of fluids from the interior of said cathode finger to a point beyond said open edge and adjacent thereto, means attached to said metal strips securing said strips and said cathode fingers to said support member, and means defining an enclosed cathode compartment between the open sides of said cathode fingers and said support member for collecting fluid discharged from said cathode fingers via said open edges, said compartment being substantially coextensive with said planar supporting means.

25. An electrolytic cell having an improved cover member therefor comprising means for feeding electrolyte and for withdrawing a gaseous product of the electrolysis reaction, said means for withdrawing gas being a gas separator extending above and below the uppermost portion of said top cover, said electrolyte feeding means and said gas separator being adapted to cooperate for the provision of a hydraulic head of electrolyte such that the level of the liquid electrolyte extends above the level of the container cover to a point within the interior of said gas separator, said portion of said gas separator which extends below the interior of said top member being adapted to maintain a pad of gas adjacent said interior of said top of said cover and permit the gradual release of said gas whenever a thickness of said pad of gas increases to the point where gas will pass under the lower edge of said downwardly extending portion.

26. The cell of claim 25 which is a diaphragm cell containing interleaved anodes and cathodes.

27. The cell of claim 25 wherein said anodes are mounted in a base upon the bottom of the container and said cathodes are of the diaphragm type and are mounted upon a means located above the bottom of the container.

28. The cell of claim 25 wherein the cathodes are of the diaphragm type and a plurality of individual cells is arranged in series within a single container.

29. The cell of claim 28 wherein dividers between individual cells extend to a point below the lower surface of the top cover and above the level of said downwardly extending portion of said gas separator, and said cell series being provided with means to maintain the level of electrolyte in each cell at a point below the upper extremity of said cell divider means.

30. The cell of claim 29 wherein said divider is removably mounted atop a support means for said anodes and cathodes and wherein said divider is constructed of chemically resistant non-conductive material.

31. In an electrolytic diaphragm cell of the Hooker type comprising:
an anode subassembly containing a horizontal base, conductive anode supporting means upon said base, elongated narrow anodes of chemically resistant conductive material embedded in said supporting means and extending substantially vertically upwardly from said support material; a cathode subassembly comprising a vertical metallic wall carrying cathodes extending therefrom, said cathodes being interleaved with said anodes and spaced therefrom, said wall carrying a cathode compartment for receiving fluid products from the interior of said cathode, said compartment communicating with conduit means for cathodic fluid products, said cathode elements being elongated, hollow, conductive members pervious to electrolyte and open on the edge adjacent said cathode chamber, said opening communicating with said cathode chamber; means for supplying an electrical potential between said cathodes and said anodes, a cover member comprising an inlet conduit for electrolyte and an outlet conduit for a gaseous reaction product; the improvement comprising means securing said cathode fingers to said metallic wall, said means comprising an elongated, flat electrically conductive current collecting and distributing strip secured with a flat face thereof parallel to said wall in said open edge of each cathode finger; means spacing said open edge from said metallic wall to define said cathode compartment, and conductive means secured to said strips and extending to said wall whereby a direct current path is provided between said wall and said cathode fingers.

32. The cell of claim 31 wherein said securing means extend through said wall.

33. A diaphragm cell comprising a plurality of single cells in series within an elongated housing, wherein said cells are made up of a plurality of cell units comprising anodes and diaphragm-containing cathodes in back-to-back relationship carried upon a generally rectangular vertically disposed planar support means, the improvement of spacing said cell units a short distance from the walls of said housing, whereby in the event a single cell within the series becomes subject to a lowering of electrolyte level, electrolyte from adjacent cells flows into said single cell.

34. The cell unit of claim 5 in combination with a container having walls, wherein said tubular support is maintained in an upright position between said wall by means of a plurality of blocks adjacent the top and bottom of said walls whereby said cell unit is slidably removable, and wherein said tubular support member is spaced a short distance from said walls thereby providing an emergency electrolyte feeding means to a cell which becomes disabled and receives insufficient electrolyte from the ordinary means for feeding said electrolyte.

References Cited

UNITED STATES PATENTS

| | | | |
|---|---|---|---|
| 1,866,065 | 7/1932 | Stuart | 204—262 |
| 2,282,058 | 5/1942 | Hunter et al. | 204—289 X |
| 2,858,263 | 10/1958 | Lucas et al. | 204—256 |
| 3,247,090 | 4/1966 | Forbes | 204—256 |

JOHN H. MACK, *Primary Examiner.*

D. R. JORDAN, *Assistant Examiner.*